UNITED STATES PATENT OFFICE.

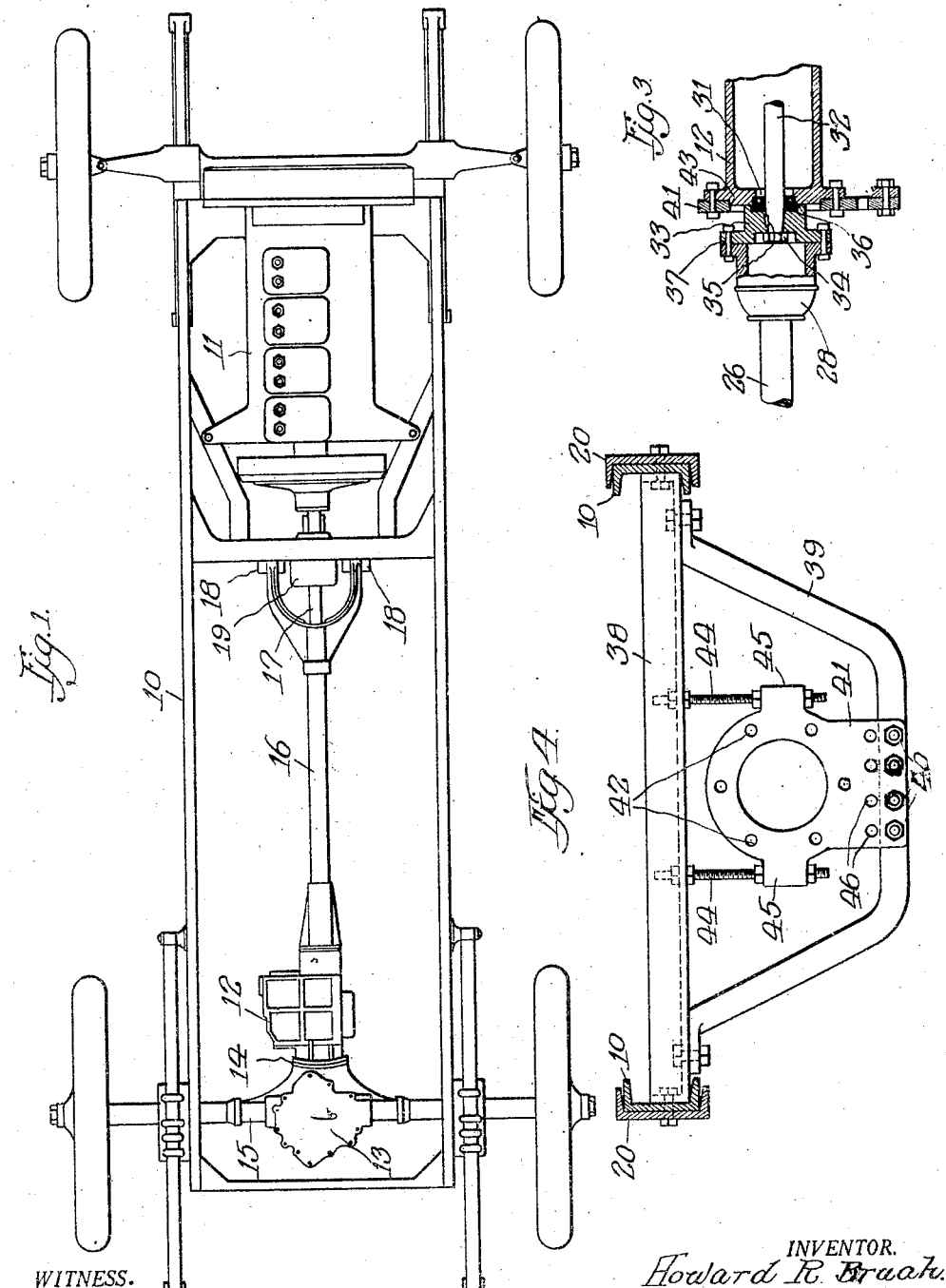

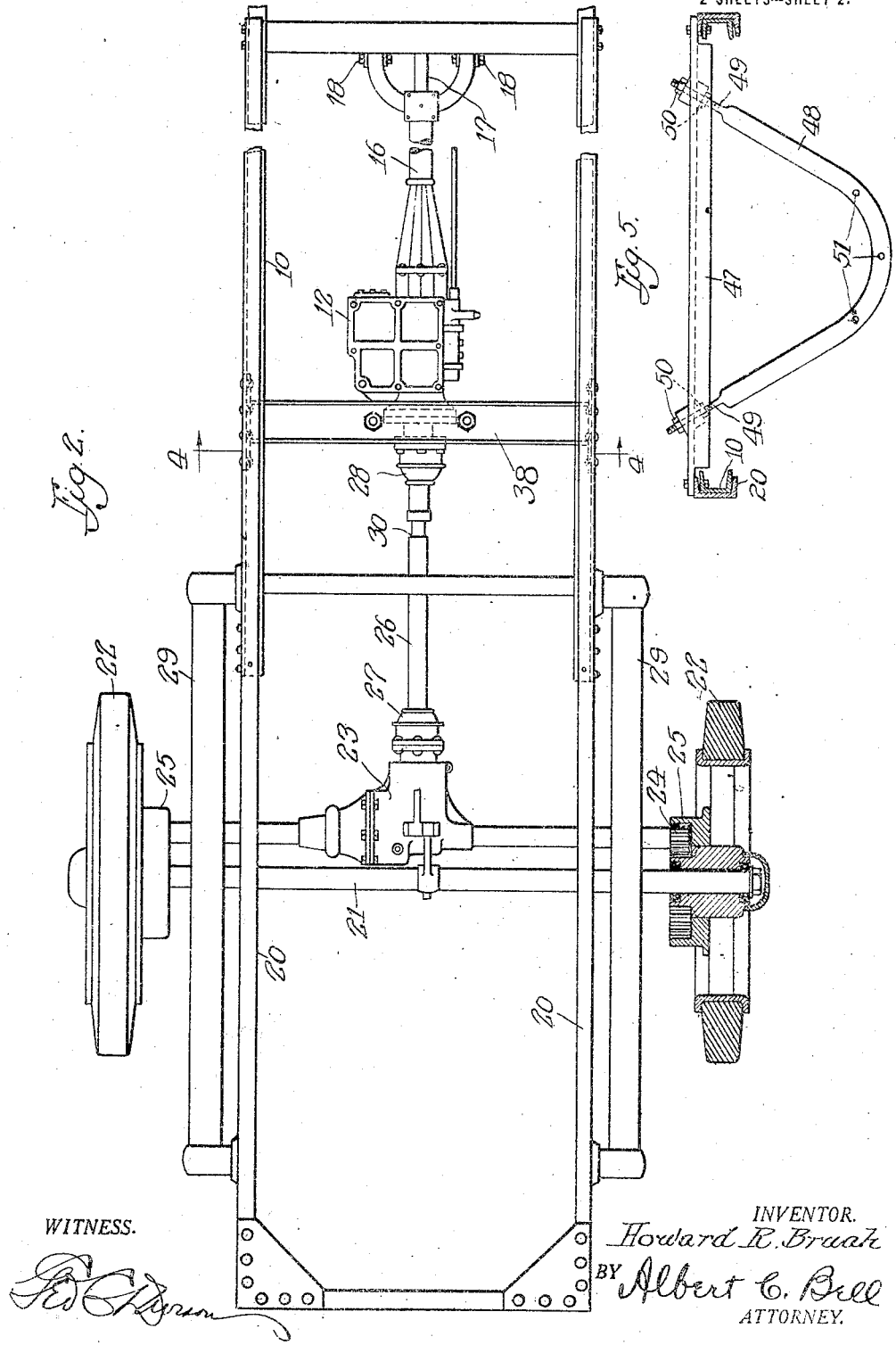

HOWARD R. BRUAH, OF CHICAGO, ILLINOIS, ASSIGNOR TO MOTOR DEVELOPMENT COMPANY, OF CHICAGO, ILLINOIS, A CORPORATION OF ILLINOIS.

CONVERTIBLE TRUCK.

1,290,709.  Specification of Letters Patent.  Patented Jan. 7, 1919.

Application filed March 17, 1917. Serial No. 155,395.

*To all whom it may concern:*

Be it known that I, HOWARD R. BRUAH, a citizen of the United States, residing at Chicago, in the county of Cook and State of Illinois, have invented a new and useful Improvement in Convertible Trucks, of which the following is a specification.

My invention relates to an improved truck unit for attachment to the chassis of an automobile by which the automobile power plant may be employed as a part of the truck, there being reduction gearing carried by the truck attachment to reduce the speed and increase the tractive force of the truck. In the past, as far as I am aware, truck units of this kind have been employed only in connection with automobiles in which the engine and transmission gearing are closely associated, either in the same casing or in separate casings adjacent each other at the front end of the chassis of the automobile. There are, however, many automobiles in which the transmission gearing is closely associated with the differential gearing carried by the rear axle of the automobile, frequently in the same or connected casings, and my invention relates particularly to a truck unit for use with automobiles of this class. By my invention the transmission casing is first separated from the differential casing and the rear axle of the automobile, together with the parts carried thereby, are removed from the automobile chassis and the extension frame of the truck unit is then secured to the automobile chassis and special supporting and connecting devices are employed for supporting the transmission casing and connecting the truck driving gearing to the transmission gearing in a manner to inclose the exposed parts contained in the transmission casing. Inasmuch as the transmission gearing is located near the rear end of the automobile chassis, the distance between the transmission gearing and the rear axle of the truck is relatively short and it is desirable to provide for placing the transmission gearing at different heights for different length wheel bases, so that the propeller shaft used in connection with my invention may extend from the transmission gearing to the rear axle of the truck with but little change in direction from the shaft of the transmission gearing with which the propeller shaft is connected and to accomplish this, I provide a supporting bracket for the transmission gearing having members which may be adjusted relatively to each other to secure the desired alinement for different length wheel bases. By my invention I also provide an improved form of coupling for connection with the shaft projecting from the transmission gearing, so that the coupling itself incloses the parts of the transmission gearing which are exposed by the removal of the transmission gearing from the differential gearing of the automobile.

My invention will best be understood by reference to the accompanying drawings showing one embodiment thereof, which are as follows:

Figure 1 shows in plan view the chassis of an automobile having associated transmission and differential mechanism to which my truck unit is to be attached, Fig. 2 shows in plan view the rear end of the automobile chassis shown in Fig. 1 with my truck unit attached thereto, Fig. 3 shows in longitudinal sectional view the coupling construction used to connect to the transmission gearing, Fig. 4 is a transverse sectional view of the parts shown in Fig. 2 taken along the line 4—4, and Fig. 5 shows in a view similar to Fig. 4, a modified form of supporting bracket for the transmission gearing.

Similar numerals refer to similar parts throughout the several views.

As shown in Fig. 1, the chassis 10 of the automobile is provided with an engine 11, a transmission casing 12 and a differential casing 13, the transmission casing and the differential casing being secured together as indicated at 14, and the differential casing 13 being mounted upon and carried by the rear axle 15 of the automobile as is commonly done in the art. The transmission casing 12 is connected by a shaft housing 16 containing the propeller shaft 17 with pivot bearings 18 near the front end of the chassis, so that the rear axle 15 may move vertically relatively to the engine 11, there being a universal coupling 19 between the propeller shaft 17 and the engine shaft.

In converting the automobile shown in Fig. 1 into a truck by means of my improved truck unit, the differential casing 13 is separated from the transmission casing 12 at 14 and the rear axle 15 and parts carried thereby are removed from the chassis 10. The side members 20 of the truck unit frame are then securely bolted to the side members of the chassis 10, as indicated in Fig. 2. The truck unit has secured to its frame a rear axle 21 upon which the truck wheels 22 are mounted and also carries a differential casing 23 from which driving shafts extend transversely of the casing to drive pinions, but one of which is shown at 24, which pinions engage internal gears 25 carried by the truck wheels to secure the necessary speed reduction for truck service. The differential gearing is connected by an auxiliary propeller shaft 26 extending longitudinally of the truck, with the transmission gearing contained in the casing 12 and this auxiliary propeller shaft 26 is provided at its ends with universal couplings 27 and 28 to allow the differential casing 23 to move vertically relatively to the frame of the truck when the springs 29 supporting the rear axle, are compressed varying amounts as occurs during the use of the truck. The propeller shaft 26 is also provided with a slip joint 30 so that the two parts of said shaft may move slightly longitudinally of each other, as may be required for the vertical motion of the differential casing referred to, the parts of the propeller shaft being prevented from moving angularly relatively to each other by any suitable devices, such as feathered keys.

As more clearly shown in Fig. 3, the separation of the transmission casing 12 from the differential casing 13 exposes to view the bearing 31 for supporting the shaft 32 of the transmission gearing, which shaft projects rearwardly from the transmission casing 12 a sufficient distance to carry a gear for driving the gearing in the differential casing 13. This gear normally carried by the projecting end of the shaft 32 is removed and a coupling 33 is secured to the projecting end of said shaft in the same manner that the gear referred to was previously secured thereto. In the particular case illustrated in the drawings, the projecting end of the shaft is tapered and provided with a key and retaining nut and for this construction the coupling 33 is provided with a tapered bore and a recess in its outer face for receiving the clamping nut 34, and also with a keyway to receive the key 35. The hub of the coupling 33 is made of sufficiently large diameter to cover the exposed portion of the bearing 31 and the end of the hub adjacent the bearing is provided with a circular recess in which a packing ring 36 of felt, or similar material, is disposed to seal the bearing and prevent the grease and oil in the bearing from working out through what would otherwise be the exposed face thereof. The coupling 33 is provided with a flange 37 which is secured to one member of the universal coupling 28 connected with the forward end of the propeller shaft 26.

To support the transmission casing 12 a bracket of the construction shown in Fig. 4 may be employed which consists of a transverse bar 38 of channel or other cross-section, the ends of which are bolted to the side members of the chassis 10 and frame 20 of the truck. The bar 38 has secured thereto by bolts, or otherwise, a bent bar 39 which extends downwardly and below the transmission casing and supports at its mid portion by bolts 40 the lower portion of a supporting plate 41 provided with holes 42 registering with the bolt holes in the end of the transmission casing 12. The end of the transmission casing is provided with a shoulder 43 and the plate 41 is bored to fit said shoulder which, together with the bolts passing through the holes 42 and the alined holes in the transmission casing securely retains the plate 41 in supporting position upon the end of said casing. Threaded rods 44 extend through the bar 38 and through lugs 45 carried by the plate 41 and are held in the position indicated in Fig. 4 by suitable nuts so as to assist in supporting the transmission casing and to prevent displacement thereof from its proper position under the action of any torque that may be exerted upon the transmission casing during the operation of the truck. The plate 41 is provided with a second set of holes 46 for receiving the bolts 40, so that when desired, the transmission casing may be supported in a lower position than that shown in Fig. 4, which is desirable when the truck has a short wheel base so as to bring the auxiliary propeller shaft 26 nearly into alinement with the propeller shaft 17. The position of the supporting plate 41, shown in Fig. 4, is that for use with a longer wheel base, for which condition the transmission casing 12 should occupy a position somewhat higher than for a short wheel base.

In the modified construction of supporting bracket shown in Fig. 5, a transverse bar 47 is employed resting on the top of the side members of the chassis 10 and the truck frame 20, from which supporting bar a bent bar 48 is carried. The transverse bar 47 may be of channel or other cross-section and is secured in place upon the frame by suitable bolts, as indicated, and the bar 48 is provided at its ends with threaded rods 49 carried by said bar, so that the bar 48 may be given different positions vertically relatively to the bar 47 by means of the adjusting nuts 50 carried by said threaded rods. The bar 48 is provided with holes 51 registering with the bolt holes in the end of the transmission casing 12, so that the bar may be securely fastened to said casing, and the bar has sufficient spring to permit placing the transmission casing at different heights relatively to the bar 47 to provide for different lengths of wheel base for the truck.

While I have shown my invention in the particular embodiments herein described, I do not, however, limit myself to these exact constructions as I may employ known mechanical equivalents thereof without departing from the spirit of my invention.

What I claim is:

1. In a convertible truck, the combination of a pleasure-car chassis having a propeller shaft connected with a transmission casing at the rear end of said chassis, said casing having a ball bearing in its rear wall and a short driving shaft extending therefrom, an extension frame secured to said chassis for lengthening said chassis to form a truck frame, a bracket extending transversely of said frame for supporting said casing, devices carried by said bracket for supporting said casing at different desired heights, a coupling secured to said driving shaft with its forward end bearing upon said casing outside of said bearing and having a recess in its forward end, a packing ring in said recess to seal said bearing, a rear axle carried by said extension frame, truck wheels mounted on said axle, differential gearing for driving said wheels, a rear propeller shaft between said coupling and said differential gearing, and a universal joint at each end of said rear propeller shaft.

2. In a convertible truck, the combination of a pleasure-car chassis having a propeller shaft connected with a transmission casing at the rear end of said chassis, said casing having a ball bearing in its rear wall and a short driving shaft extending therefrom, an extension frame secured to said chassis for lengthening said chassis to form a truck frame, a bracket extending transversely of said frame for supporting said casing, a coupling secured to said driving shaft with its forward end bearing upon said casing outside of said bearing and having a recess in its forward end, a packing ring in said recess to seal said bearing, a rear axle carried by said extension frame, truck wheels mounted on said axle, differential gearing for driving said wheels, a rear propeller shaft between said coupling and said differential gearing, and a universal joint at each end of said rear propeller shaft.

3. In a convertible truck, the combination of a pleasure car chassis having a propeller shaft connected with a transmission casing at the rear end of said chassis, said casing having a ball bearing in its rear wall and a short driving shaft extending therefrom, an extension frame secured to said chassis for lengthening said chassis to form a truck frame, a bracket extending transversely of said frame for supporting said casing, a coupling secured to said driving shaft having a recess in its forward end, a packing ring in said recess to seal said bearing, a rear axle carried by said extension frame, truck wheels mounted on said axle, differential gearing for driving said wheels, a rear propeller shaft between said coupling and said differential gearing, and a universal joint at each end of said rear propeller shaft.

4. In a convertible truck, the combination of a pleasure-car chassis having a propeller shaft connected with a transmission casing at the rear end of said chassis, said casing having a ball bearing in its rear wall and a short driving shaft extending therefrom, an extension frame secured to said chassis, for lengthening said chassis to form a truck frame, a bracket extending transversely of said frame for supporting said casing, a coupling secured to said driving shaft, a rear axle carried by said extension frame, truck wheels mounted on said axle, differential gearing for driving said wheels, a rear propeller shaft between said coupling and said differential gearing, and a universal joint at each end of said rear propeller shaft.

5. In a convertible truck, the combination of a pleasure-car chassis having a propeller shaft connected with a transmission casing at the rear end of said chassis, said casing having a ball bearing in its rear wall and a short driving shaft extending therefrom, an extension frame secured to said chassis for lengthening said chassis to form a truck frame, a bracket extending transversely of said frame for supporting said casing, a rear axle carried by said extension frame, truck wheels mounted on said axle, differential gearing for driving said wheels, and driving connections between said driving shaft and said differential gearing.

6. In a convertible truck, the combination of a pleasure-car chassis having a propeller shaft connected with a transmission casing at the rear end of said chassis, said casing having a ball bearing in its rear wall and a short driving shaft extending therefrom, an extension frame secured to said chassis for lengthening said chassis to form a truck frame, a bracket extending transversely of said frame for supporting said casing, devices carried by said bracket for supporting said casing at different desired heights, a rear axle carried by said extension frame, truck wheels mounted on said axle, differential gearing for driving said wheels, and driving connections between said driving shaft and said differential gearing.

7. In a convertible truck, the combination of a pleasure-car chassis having a propeller shaft connected with a transmission casing at the rear end of said chassis, said casing having a ball bearing in its rear wall and a short driving shaft extending therefrom, an extension frame secured to said chassis for lengthening said chassis to form a truck frame, a bracket extending transversely of said frame for supporting said casing, devices carried by said bracket for supporting said casing at different desired heights, a coupling secured to said driving shaft having a recess in its forward end, a packing ring in said recess, a rear axle carried by said extension frame, truck wheels mounted on said axle, differential gearing for driving said gearing, and a universal joint at each end of said rear propeller shaft.

8. In a convertible truck, the combination of a pleasure-car chassis having a propeller shaft connected with a transmission casing at the rear end of said chassis, said casing having a ball bearing in its rear wall and a short driving shaft extending therefrom, an extension frame secured to said chassis for lengthening said chassis to form a truck frame, a bracket extending transversely of said frame for supporting said casing, devices carried by said bracket for supporting said casing at different desired heights, a coupling secured to said driving shaft, a rear axle carried by said extension frame, truck wheels mounted on said axle, differential gearing for driving said wheels, a rear propeller shaft between said coupling and said differential gearing, and a universal joint at each end of said rear propeller shaft.

9. In a convertible truck, the combination of a pleasure-car chassis having a propeller shaft connected with a transmission casing at the rear end of said chassis, said casing having a ball bearing in its rear wall and a short driving shaft extending therefrom, an extension frame secured to said chassis for lengthening said chassis to form a truck frame, means for supporting said casing, a coupling secured to said driving shaft with its forward end bearing upon said casing outside of said bearing and having a recess in its forward end, a packing ring in said recess to seal said bearing, a rear axle carried by said extension frame, truck wheels mounted on said axle, differential gearing for driving said wheels, a rear propeller shaft between said coupling and said differential gearing, and a universal joint at each end of said rear propeller shaft.

10. In a convertible truck, the combination of a pleasure-car chassis having a propeller shaft connected with a transmission casing at the rear end of said chassis, said casing having a ball bearing in its rear wall and a short driving shaft extending therefrom, an extension frame secured to said chassis for lengthening said chassis to form a truck frame, means for supporting said casing, a coupling secured to said driving shaft having a recess in its forward end, a packing ring in said recess to seal said bearing, a rear axle carried by said extension frame, truck wheels mounted on said axle, differential gearing for driving said wheels, a rear propeller shaft between said coupling and said differential gearing, and a universal joint at each end of said rear propeller shaft.

11. In a convertible truck, the combination of a pleasure-car chassis having a propeller shaft connected with a transmission casing at the rear end of said chassis, said casing having a ball bearing in its rear wall and a short driving shaft extending therefrom, an extension frame secured to said chassis for lengthening said chassis to form a truck frame, means for supporting said casing, a coupling secured to said driving shaft, a rear axle carried by said extension frame, truck wheels mounted on said axle, differential gearing for driving said wheels, a rear propeller shaft between said coupling and said differential gearing, and a universal joint at each end of said rear propeller shaft.

12. In a convertible truck, the combination of a pleasure-car chassis having a propeller shaft connected with a transmission casing at the rear end of said chassis, said casing having a bearing in its rear wall and a short driving shaft extending therefrom, an extension frame for lengthening said chassis to form a truck frame, attachment means for supporting said casing in its new relation to the rear axle, a coupling secured to said driving shaft, a rear axle carried by said extension frame, truck wheels mounted on said axle, differential gearing for driving said wheels, and driving connections between said driving shaft and said differential gearing.

13. As a means for forming a truck from an automobile having a combined differential and transmission casing, an extension frame for connection with the chassis of the automobile, transmission mechanism and a casing therefor forming a part of said automobile, a bracket extending transversely of said frame for supporting said transmission casing, devices carried by said bracket for supporting said casing at different desired heights, a coupling secured to said transmission mechanism with its forward end bearing upon said casing and having a recess in its forward end, a packing ring in said recess, a rear axle carried by said extension frame, truck wheels mounted on said axle, differential gearing for driving said wheels, a rear propeller shaft between said coupling and said differential gearing, and a universal joint at each end of said rear propeller shaft.

14. As a means for forming a truck from an automobile having a combined differential and transmission casing, an extension frame for connection with the chassis of the automobile, transmission mechanism and a casing therefor forming a part of the automobile, a bracket extending transversely of said frame for supporting said transmission casing, a coupling secured to said transmission mechanism with its forward end bearing upon said casing and having a recess in its forward end, a packing ring in said recess, a rear axle carried by said extension frame, truck wheels mounted on said axle, differential gearing for driving said wheels, a rear propeller shaft between said coupling and said differential gearing, and a universal joint at each end of said rear propeller shaft.

15. As a means for forming a truck from an automobile having a combined differential and transmission casing, an extension frame for connection with the chassis of the automobile, transmission mechanism and a casing therefor forming a part of the automobile, a bracket extending transversely of said frame for supporting said transmission casing, a coupling secured to said transmission mechanism having a recess in its forward end, a packing ring in said recess, a rear axle carried by said extension frame, truck wheels mounted on said axle, differential gearing for driving said wheels, a rear propeller shaft between said coupling and said differential gearing, and a universal joint at each end of said rear propeller shaft.

16. As a means for forming a truck from an automobile having a combined differential and transmission casing, an extension frame for connection with the chassis of the automobile, transmission mechanism and a casing therefor forming a part of the automobile, a bracket extending transversely of said frame for supporting said transmission casing, a coupling secured to said transmission mechanism, a rear axle carried by said extension frame, truck wheels mounted on said axle, differential gearing for driving said wheels, a rear propeller shaft between said coupling and said differential gearing, and a universal joint at each end of said rear propeller shaft.

17. As a means for forming a truck from an automobile having a combined differential and transmission casing, an extension frame for lengthening the chassis of the automobile, transmission mechanism and a casing therefor forming a part of the automobile, a bracket extending transversely of said frame constituting a new support for said transmission casing, a rear axle carried by said extension frame, truck wheels mounted on said axle, and driving connections between the transmission mechanism and said truck wheels.

18. As a means for forming a truck from an automobile having a combined differential and transmission casing, an extension frame for connection with the chassis of the automobile, transmission mechanism and a casing therefor forming a part of the automobile, a bracket extending transversely of said frame for supporting said transmission casing, devices carried by said bracket for supporting said casing at different desired heights, a rear axle carried by said extension frame, truck wheels mounted on said axle, differential gearing for driving said wheels, and driving connections between the transmission mechanism and said differential gearing.

19. As a means for forming a truck from an automobile having a combined differential and transmission casing, an extension frame for connection with the chassis of the automobile, transmission mechanism and a casing therefor forming a part of the automobile, a bracket extending transversely of said frame for supporting said transmission casing, devices carried by said bracket for supporting said casing at different desired heights, a coupling secured to said transmission mechanism having a recess in its forward end, a packing ring in said recess, a rear axle carried by said extension frame, truck wheels mounted on said axle, differential gearing for driving said wheels, a rear propeller shaft between said coupling and said differential gearing, and a universal joint at each end of said rear propeller shaft.

20. As a means for forming a truck from an automobile having a combined differential and transmission casing, an extension frame for connection with the chassis of the automobile, transmission mechanism and a casing therefor forming a part of the automobile, a bracket extending transversely of said frame for supporting said transmission casing, devices carried by said bracket for supporting said casing at different desired heights, a coupling secured to said transmission mechanism, a rear axle carried by said extension frame, truck wheels mounted on said axle, differential gearing for driving said wheels, a rear propeller shaft between said coupling and said differential gearing, and a universal joint at each end of said rear propeller shaft.

21. As a means for forming a truck from an automobile having a combined differential and transmission casing, an extension frame for connection with the chassis of the automobile, transmission mechanism and a casing therefor forming a part of the automobile, means for supporting said transmission casing, a coupling secured to said transmission mechanism with its forward end bearing upon said casing and having a recess in its forward end, a packing ring in said recess, a rear axle carried by said extension frame, truck wheels mounted on said axle, differential gearing for driving said wheels, a rear propeller shaft between said coupling and said differential gearing, and a universal joint at each end of said rear propeller shaft.

22. As a means for forming a truck from an automobile having a combined differential and transmission casing, an extension frame for connection with the chassis of the automobile, transmission mechanism and a casing therefor forming a part of the automobile, means for supporting said transmission casing, a coupling secured to said transmission mechanism having a recess in its forward end, a packing ring in said recess, a rear axle carried by said extension frame, truck wheels mounted on said axle, differential gearing for driving said wheels, a rear propeller shaft between said coupling and said differential gearing, and a universal joint at each end of said rear propeller shaft.

23. As a means for forming a truck from an automobile having a combined differential and transmission casing, an extension frame for lengthening the chassis of the automobile, transmission mechanism and a casing therefor forming a part of the automobile, attachment means for supporting said transmission casing in its new relation to the rear axle, a coupling secured to said transmission mechanism, a rear axle carried by said extension frame, truck wheels mounted on said axle, differential gearing for driving said wheels, a rear propeller shaft between said coupling and said differential gearing, and a universal joint at each end of said rear propeller shaft.

24. As a means for forming a truck from an automobile having a combined differential and transmission casing, an extension frame for lengthening the chassis of the automobile, transmission mechanism and a casing therefor forming a part of the automobile, attachment means for supporting said transmission casing in its new relation to the rear axle, a coupling secured to said transmission mechanism, a rear axle carried by said extension frame, truck wheels mounted on said axle, and driving connections between said coupling and said truck wheels.

25. A coupling for an automobile transmission having a projecting shaft and an exposed bearing, comprising a hub portion and a flange portion, said hub portion being bored to engage said shaft and having an end conformation to inclose said bearing.

26. A coupling for an automobile transmission having a projecting shaft and an exposed bearing, comprising a hub portion and a flange portion, said hub portion being bored to engage said shaft and having an end conformation to inclose said bearing and provided with a recess in its end, and a packing ring in said recess.

27. A coupling for an automobile transmission having a projecting shaft and an exposed bearing, comprising a hub portion and a flange portion, said hub portion being bored to engage said shaft and having an end conformation to inclose said bearing and provided with a recess in its end, and a packing ring in said recess, said end being conformed to rest against the casing of said transmission around said bearing.

28. As a means for supporting a transmission casing from the frame of an automobile, a bar substantially equal in length to the width of said frame, devices for rigidly securing said bar to said frame, and connecting mechanism carried by said bar for removably engaging the transmission casing, said connecting mechanism having a plurality of engaging positions for supporting said casing at different desired heights relatively to said bar.

29. In a convertible truck, the combination of a pleasure-car chassis having a propeller shaft connected with a transmission casing at the rear end of said chassis, said casing having a short driving shaft extending therefrom, an extension frame secured to said chassis for lengthening said chassis to form a truck frame, a bracket extending transversely of said frame for supporting said casing, a coupling secured to said transmission mechanism, a rear driving shaft and driving connections between said coupling and said rear driving shaft.

30. In a convertible truck, the combination of a pleasure-car chassis having a propeller shaft connected with a transmission casing at the rear end of said chassis, said casing having a short driving shaft extending therefrom, an extension frame secured to said chassis for lengthening said chassis to form a truck frame, means for supporting said transmission casing in its new relation, a coupling secured to said transmission mechanism, a rear driving shaft and driving connections between said coupling and said rear driving shaft.

In witness whereof, I hereunto subscribe my name this 14th day of March, A. D. 1917.

HOWARD R. BRUAH.